United States Patent
Jones

(10) Patent No.: US 8,000,729 B1
(45) Date of Patent: Aug. 16, 2011

(54) MOBILE TO MOBILE TEXT MESSAGING USING KEYED MODULATION

(75) Inventor: Bryce A. Jones, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 561 days.

(21) Appl. No.: 12/204,131

(22) Filed: Sep. 4, 2008

(51) Int. Cl.
*H04W 4/00* (2009.01)

(52) U.S. Cl. ............... 455/466; 455/432.2; 455/456.6; 455/418; 455/566; 455/90.3

(58) Field of Classification Search ............... 455/466, 455/432.2, 456.6, 418, 566, 90.3
See application file for complete search history.

(56) References Cited

U.S. PATENT DOCUMENTS

| | | | |
|---|---|---|---|
| 6,249,808 | B1 | 6/2001 | Seshadri |
| 6,418,323 | B1 | 7/2002 | Bright et al. |
| 6,917,813 | B2 | 7/2005 | Elizondo |
| 7,170,430 | B2 | 1/2007 | Goodgoll |
| 2002/0160818 | A1* | 10/2002 | Nelson et al. ............ 455/566 |
| 2004/0189484 | A1* | 9/2004 | Li ........................ 340/825.19 |
| 2006/0019615 | A1* | 1/2006 | Ditmer ..................... 455/90.3 |
| 2008/0182602 | A1* | 7/2008 | Park et al. ................ 455/466 |
| 2009/0253377 | A1* | 10/2009 | Trachewsky ............. 455/67.11 |

FOREIGN PATENT DOCUMENTS

WO 2004086206 A2 10/2004

* cited by examiner

*Primary Examiner* — Kamran Afshar
*Assistant Examiner* — Mong-Thuy Tran

(57) ABSTRACT

A text messaging system conveys text messages between a sender and a recipient in a wireless carrier network. A sender mobile handset includes manual input for identifying text characters in a message to be sent to the recipient and an audio-band encoder coupled to the manual input for representing the text characters with a keyed modulation stream. The keyed modulation stream is transmitted over a non-signaling channel of the wireless carrier network to a base station. At least one mobile switching center in the wireless carrier network transports the message between the sender mobile handset and the recipient mobile handset. A demodulator operating on behalf of the recipient converts the keyed modulation stream to decoded text. A recipient mobile handset including a display interface and a display receives the decoded text and displays the text characters of the message to the recipient.

12 Claims, 4 Drawing Sheets

MOBILE TO MOBILE TEXT MESSAGING USING KEYED MODULATION

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to delivery of mobile to mobile text messages, and, more specifically, to use of a dit-dah code to send text messages over a non-signaling channel of a cellular wireless network.

The Short Message Service (SMS) was introduced to allow cell phone subscribers to exchange text messages between handsets. Instead of using a direct connection between handsets, the signaling or control channel of the cellular network has been used for transporting the text messages. The signaling channel connects to an SS7 network within the core network of the cellular provider that monitors handset locations and routes call signaling messages for establishing and terminating voice calls.

To avoid congestion, a limit of 160 characters was imposed on SMS text messages by the relevant IS-41 standard because the signaling channel and the other portions of the service provider's SS7 network typically have a limited extra capacity for devoting to SMS. Due to the popularity of the SMS service, the sending and receiving of text messages has nevertheless become a burden on the SS7 network which results in delays in both call processing and text message delivery. Thus, it would be desirable to remove message delivery delays, eliminate the character length limit, and avoid congestion in the SS7 network and the signaling channel.

Manual SMS text creation on conventional handsets is relatively inefficient. Text entry is usually performed using triple-tap sequences on the alpha-numeric keys on a handset or by tapping individual letter keys on a miniature keyboard (if so equipped). The small size of the keys on a handset makes text entry slower and requires the user to look at the keypad during a text entry. In competitions between Morse code operators and the fastest phone text messengers, Morse code has been shown to be faster and more efficient. Thus, it would be desirable to facilitate a faster and more efficient method of text entry for users who know or are willing to learn Morse code or similar methods of text entry.

Conventional SMS is also relatively inefficient in terms of transmission bandwidth utilization. Data packets sent via the signaling channel include ASCII code representation of the text. The ASCII encoding and the digital transport methods used in the signaling channel provide low error rates but are wasteful of channel capacity compared to other forms of encoding.

SUMMARY OF THE INVENTION

The present invention utilizes keyed modulation in at least one portion of the transport chain between a sender and recipient of a text message. Dit-dah encoding is preferably used in a keyed modulation stream. Depending on the specific implementation, the system achieves improvements such as shorter message delivery time, longer permitted message length, increased text entry efficiency, higher transport bandwidth efficiency, and eliminating use of the signaling network.

In one aspect of the invention, a text messaging system conveys text messages between a sender and a recipient in a wireless carrier network. A sender mobile handset includes manual input for identifying text characters in a message to be sent to the recipient and an audio-band encoder coupled to the manual input for representing the text characters with a keyed modulation stream. The keyed modulation stream is transmitted over a non-signaling channel of the wireless carrier network to a base station. At least one mobile switching center in the wireless carrier network transports the message between the sender mobile handset and the recipient mobile handset. A demodulator operating on behalf of the recipient converts the keyed modulation stream to decoded text. A recipient mobile handset including a display interface and a display receives the decoded text and displays the text characters of the message to the recipient.

DETAILED DESCRIPTION OF PREFERRED EMBODIMENTS

Figure 1:
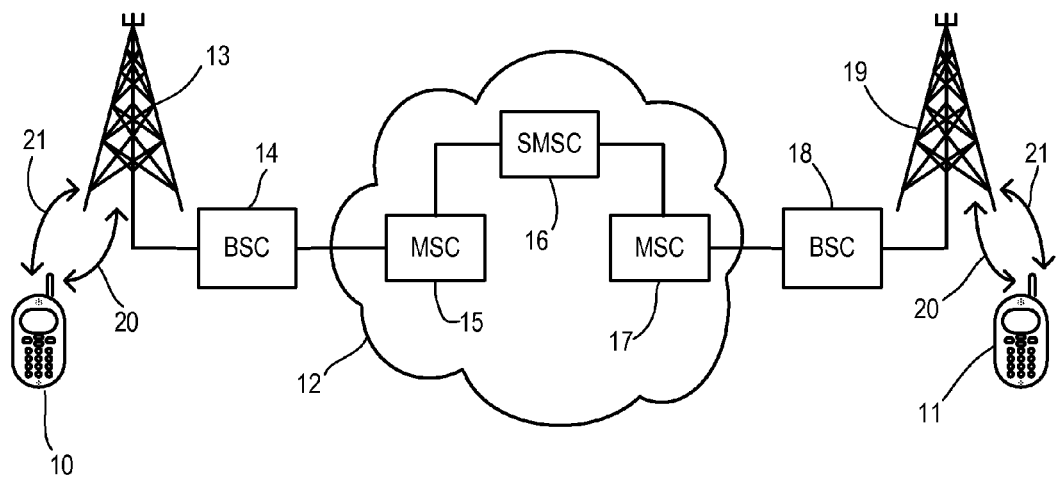
FIG. 1 is a block diagram showing a conventional network for delivering SMS text messages.

Referring now to FIG. 1, a conventional SMS system is shown for exchanging text messages between handsets 10 and 11 via a cellular carrier network 12. Handset 10 communicates wirelessly with a cell site 13 comprising a conventional base transceiver station (BTS) and antenna. A base station controller (BSC) 14 couples the BTS to a mobile switching center (MSC) 15 in core network 12. An SMS controller (SMSC) 16 receives text messages generated by handset 10 and forwarded through a signaling channel via cell site 13, BSC 14, and MSC 15. SMSC 16 provides a store and forward function to deliver the SMS text message to handset 11 when handset 11 is available to the network via an MSC 17, BSC 18, and cell site 19.

Handsets 10 and 11 communicate with their respective cell sites via signaling channels 20 and voice channels 21. SMS text messaging is conducted via signaling channels 20 while voice calls are conducted using voice channels 21 after a call is setup using signaling channels 20.

Figure 2:
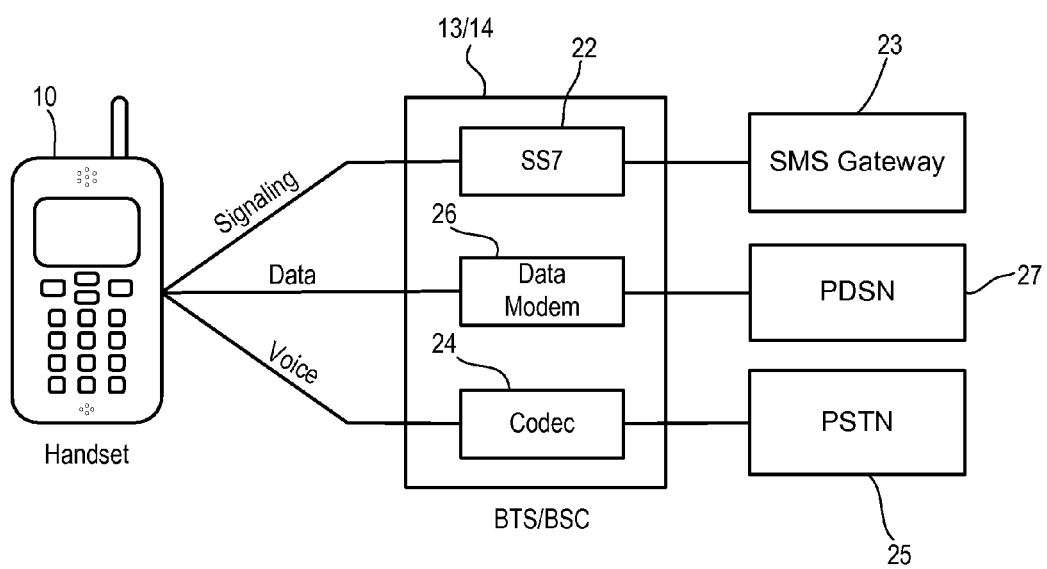
FIG. 2 is a block diagram showing interaction between a cellular wireless handset and a cellular network.

The channels available for operation of a handset 10 are shown in greater detail in FIG. 2. A signaling channel connects to an SS7 network 22 via the BTS 13 and BSC 14. An SMS gateway 23 connected to the SS7 network 22 interfaces with an SMS control center for providing the store and forward feature of text messages to a recipient. A voice channel couples handset 10 to a codec 24 for exchanging voice data with other call end points such as in the public switch telephone network (PSTN) 25. Codec 24 works in tandem with a codec in handset 10 as known in the art. Handset 10 may further include a data channel interfaced with a data modem 26 coupled to a packet data serving node (PDSN) 27. The signaling, voice, and data channels can be broadcast over a common radio frequency interface such as code division multiple accesses (CDMA), for example. Either of the non-signaling channels (i.e., the voice channel or the data channel) can be used for sending text messages in the present invention. However, the voice channel is preferred because it can be more efficiently used with low vocoding rates and because the cellular system is setup for easily establishing voice channels between handsets (which can then be used to deliver text via an encoded audio signal while the audio speaker is muted).

Figure 3:
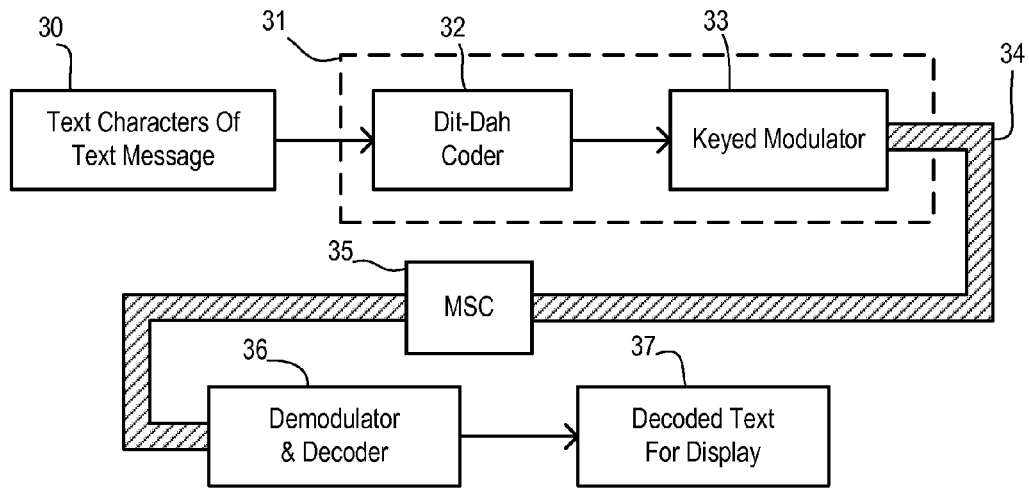
FIG. 3 is a block diagram showing a text message flow according to one preferred embodiment of the present invention.

The basic elements of a text messaging system of the present invention are summarized in FIG. 3. In block 30, the text characters of a text message are defined by the sender. For example, the manual entry of text characters for a message can be made by any convenient method such as triple tap, typing on a full keypad, speech-to-text conversion, or tapping Morse code on one or more dit-dah keys. An audio band encoder 31 receives the text characters and performs a conversion to represent the text characters within a keyed modulation stream. Audio-band encoder 31 preferably includes a modem such as a keyed modulator 33 to generate the keyed modulation stream. If the text characters are not entered manually as a dit-dah code, then a dit-dah encoder 32 is provided in encoder 31. The manual input and/or dit-dah encoder 32 preferably provide a Morse code representation of the text characters. Other dit-dah encodings can also be used such as Baudot Code or Wabun Code. As used herein, keyed modulation means any modulation scheme for binary encoding of the represented text in the audio band such as on-off keying, frequency-shift keying, phase-shift keying, amplitude-shift keying, quadrature-amplitude modulation, continuous phase modulation, or any other types of modulation for encoding a binary text representation within an audio frequency signal. Preferably, a modem in the handset generates a keyed modulation stream which is capable of transcoder free operation (TrFO) when transporting the stream over the cellular network. The transcoder free operation preferably complies with TrFO requirements as provided by 3GPP2 standards document S.R0096-0 using the lowest coding rate available.

The keyed modulation stream is transmitted over a non-signaling channel 34 via a base transceiver station to at least one MSC 35 in the wireless carrier network. The stream is transported between the sender's mobile handset and the recipient's mobile handset by MSC 35 to a demodulator and decoder 36 which outputs decoded text for display at block 37. Preferably, non-signaling channel 34 is comprised of a voice channel opened between the sender's handset and the demodulator-decoder (typically residing in the recipient's handset).

Figure 4:
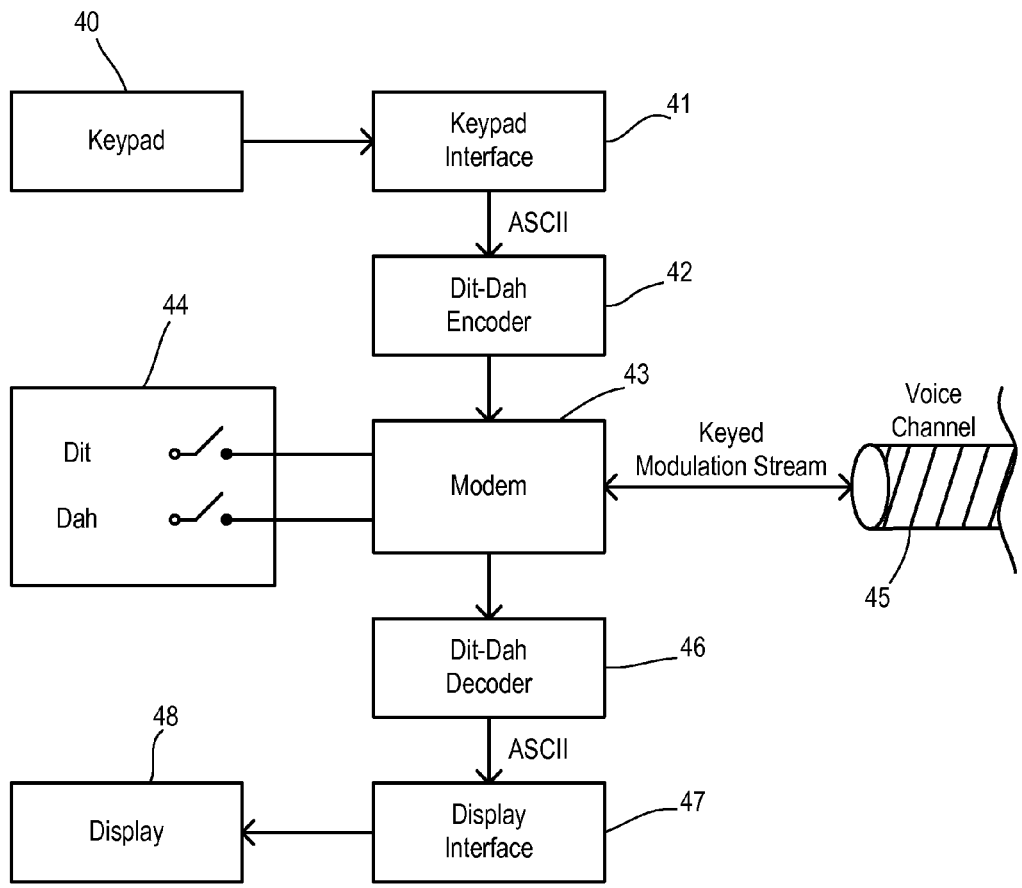
FIG. 4 is a block diagram showing a handset of the present invention in greater detail.

A handset for text messaging according to the present invention is shown in FIG. 4. A keypad 40 coupled to a keypad interface 41 can provide conventional text entry, such as triple tap or full keyboard entry so that text characters are sequentially provided to a dit-dah encoder 42 in an ASCII format. In response to each ASCII character, dit-dah encoder 42 creates a dit-dah representation of the text characters for output to a modem 43. Alternatively, the dit-dah code may be manually generated using a manual input 44 comprised of at least one key element used to signify a dit and/or a dah. Both dit and dah can be generated using one key provided that the user activates the key with appropriate timing. Alternatively, two separate keys can be provided for dit and dah, respectively, to simplify entry (so that the user does not have to accurately produce the timing themselves). Thus, when separate dit and dah keys are used, manual input 44 includes timing circuitry to generate the actual dit-dah code to be provided to modem 43.

Modem 43 modulates the dit-dah encoded signal to generate the keyed modulation stream which is provided to a voice channel 45 for transporting the stream to a recipient. When a text message is received over voice channel 45 from a remote user, the keyed modulation stream directed from voice channel 45 to modem 43 is demodulated to recover a dit-dah representation of the received text message. A dit-dah decoder 46 converts the received text into ASCII format so that it can be provided to a display interface 47 which drives a display 48 with the decoded text.

Figure 5:
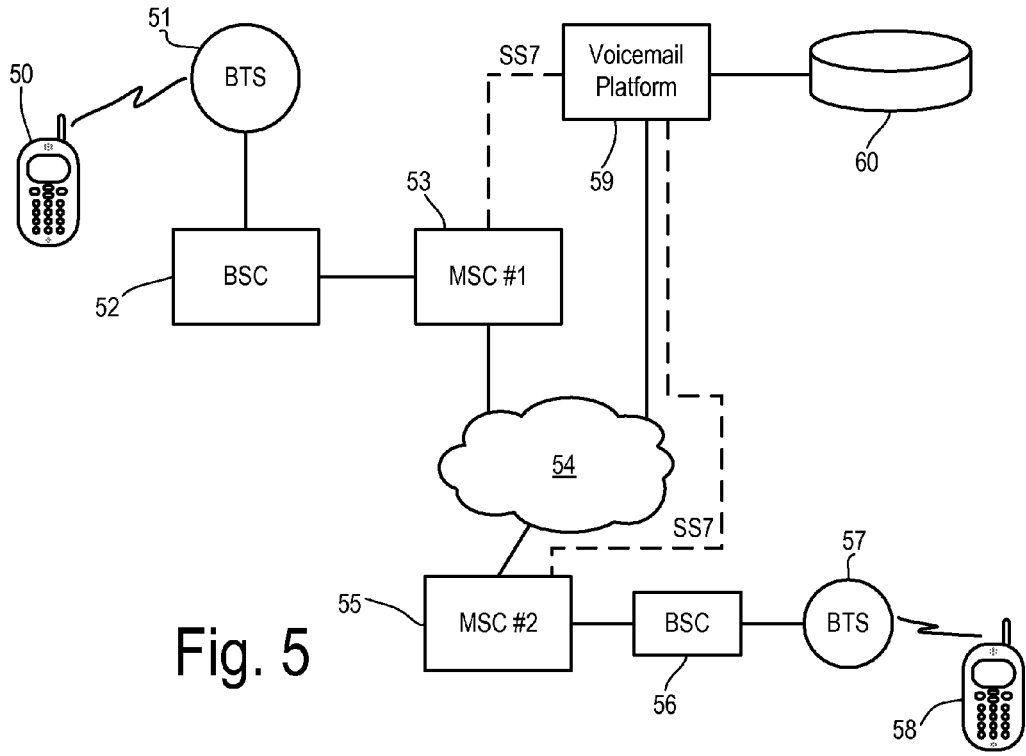
FIG. 5 is a network diagram showing a preferred embodiment with end-to-end transmission of a dit-dah text message.

The details of text message delivery according to the present invention vary according to whether the recipient handset is capable of processing the text message generated by the sending handset in the form of a keyed modulation stream or whether it is only capable of receiving a conventional SMS text message. FIG. 5 illustrates an embodiment wherein the recipient handset is capable of receiving a keyed modulation stream. Thus, a sender handset 50 sends the keyed modulation stream via a BTS 51 and a BSC 52 to a first MSC 53. When a recipient handset 58 is available for receiving a message (i.e., not busy or off network) then the keyed modulation stream is sent through the cellular provider's network to a second MSC 55 which forwards the keyed modulation stream through a BSC 56 and a BTS 57 to recipient handset 58.

In the event that recipient handset 58 is busy on another call or is off network and is not available, the core network redirects the text message to a voicemail platform 59 which stores the keyed modulation stream in a storage drive 60 as an audio signal for later delivery to recipient handset 58. Thus, MSC 53 and MSC 55 interact with voicemail platform 59 via the SS7 network to forward the stream for recording and subsequent delivery of the text message. Whether sent in real time or from the voicemail platform, when a call is established to recipient handset 58 for delivering a text message via a keyed modulation stream, an activating signal or flag is provided to recipient handset 58 so that it activates its respective modem in the appropriate manner to demodulate and decode text from the keyed modulation stream. The flag may be included in the page signal sent to the recipient handset during initial call signaling, for example.

Figure 6:
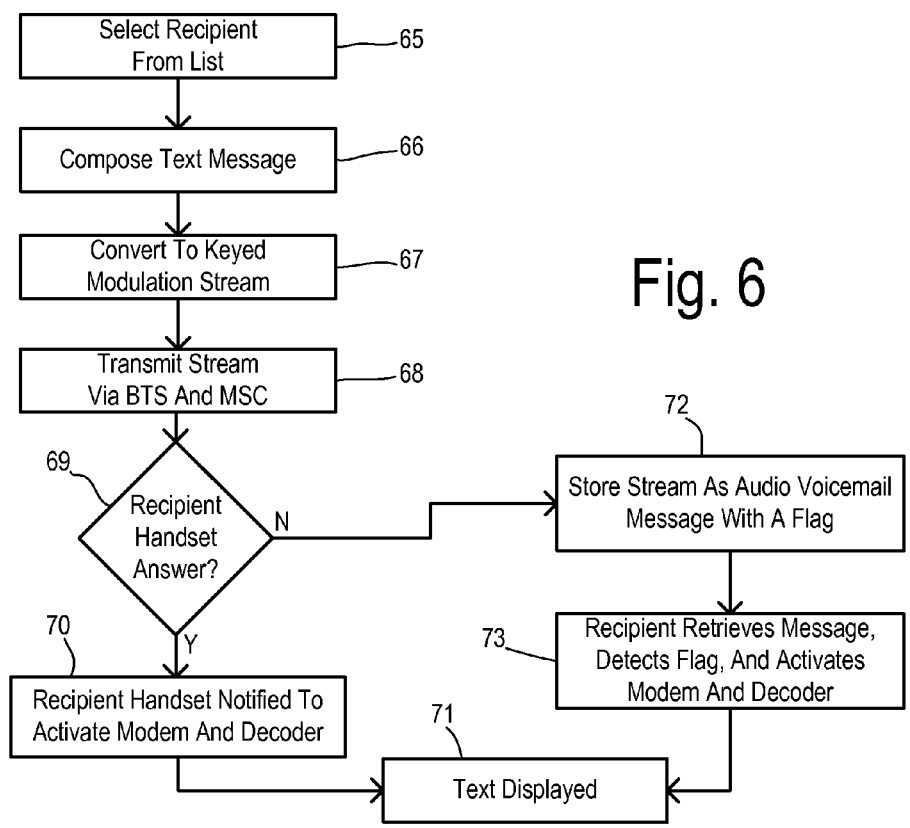
FIG. 6 is a flowchart showing one preferred method corresponding to the diagram of FIG. 5.

A preferred method of sending mobile to mobile text messages via a wireless cellular carrier network configured as shown in FIG. 5 is shown in the flowchart of FIG. 6. In step 65, the sending user selects the recipient from a list such as a buddy list or other contact list. Alternatively, the recipient could be identified by entering their mobile directory number. The sender composes a text message in step 66 using a conventional method which generates ASCII characters or by manipulating dit-dah buttons to directly generate a dit-dah code such as Morse code. The text message is converted to a keyed modulation stream in step 67. In step 68, a call is established between handsets via respective base transceiver stations and at least one MSC in the cellular network in an attempt to transmit the keyed modulation stream.

In step 69, a check is made to determine whether the recipient handset answers the call. If yes, then the recipient handset is notified in step 70 to activate its modem and/or decoder for converting the keyed modulation stream to the original text message. Then the text is displayed on the recipient handset in step 71.

If the recipient does not answer in step 69, then the keyed modulation stream is stored as an audio voicemail message in step 72 together with a flag or other indicator that the voicemail message is a keyed modulation stream. When the recipient handset becomes available to receive the voicemail message, then it retrieves the message, detects the flag, and activates the modem and decoder in step 73. Thereafter, the text is displayed in step 71.

Figure 7:
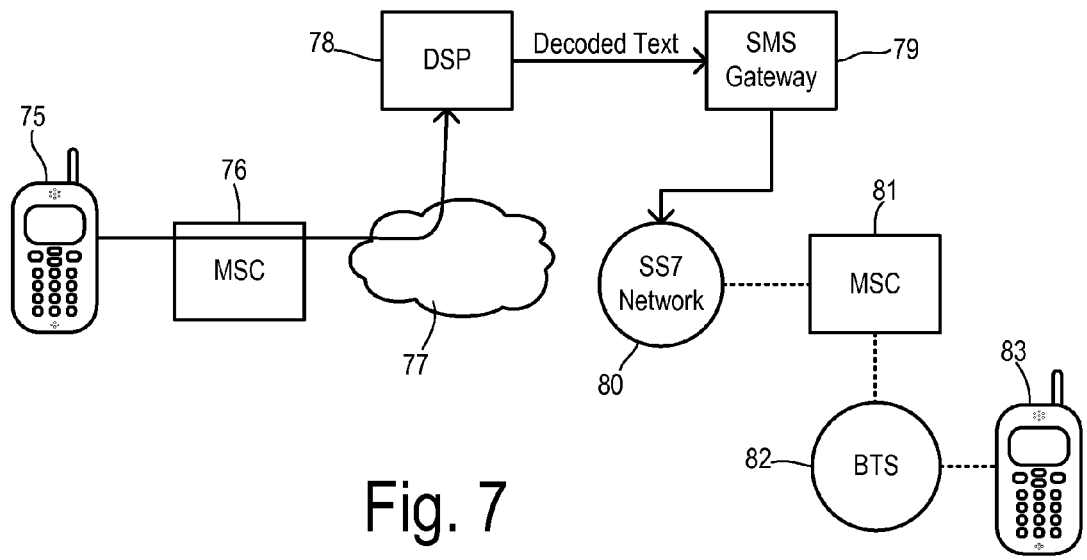
FIG. 7 is a network diagram showing a preferred embodiment wherein the recipient handset does not have the capability of handling a dit-dah text message.

When the recipient handset does not have keyed modulation stream capability, then delivery of the text message can be achieved as shown in FIG. 7. A sender handset 75 generates a keyed modulation stream as discussed above. The stream is forwarded through an MSC 76 over a non-signaling channel from the sender handset toward the recipient handset via network 77 to a demodulator operating on behalf of the recipient in the form of a digital signal processor (DSP) 78. In this embodiment, the demodulator performing conversion for the recipient is not actually located in the recipient's handset. Instead, it is located within the service provider's network, where it can perform text conversion for a plurality of different recipients who do not have compatible handsets.

DSP 78 generates decoded text which is provided to an SMS gateway 79. From gateway 79, the decoded text can be provided as a conventional SMS text message via an SS7 network 80, an MSC 81, and a BTS 82 to recipient handset 83. Since the demodulator portion of a modem operating on behalf of the recipient to convert the keyed modulation stream to decoded text can be located either in the recipient handset or in the wireless carrier network, the sender of a text message can use the keyed modulation of the present invention regardless of what kind of handset will be used by the recipient.

Figure 8:
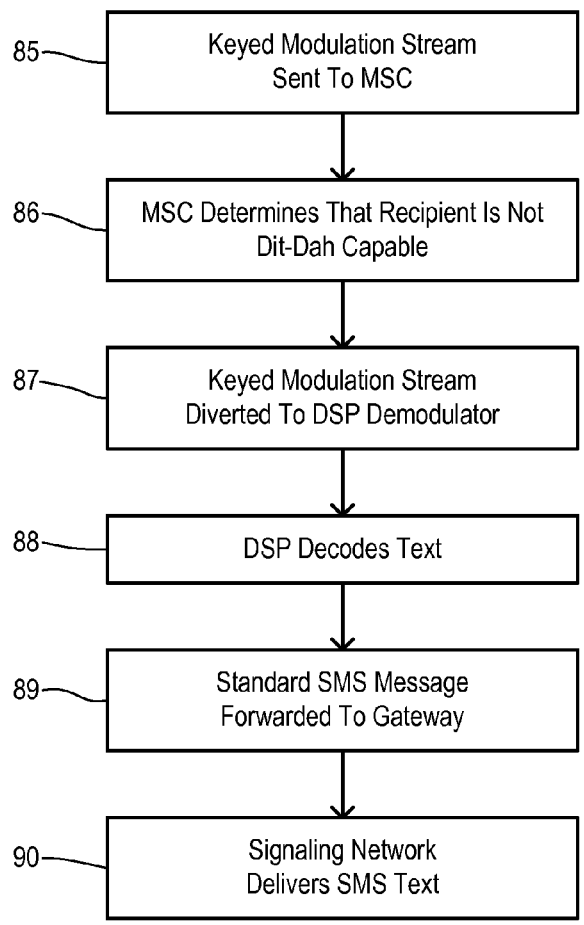
FIG. 8 is a flowchart showing one preferred method corresponding to the diagram of FIG. 7.

The system of FIG. 7 preferably employs a method as shown in FIG. 8. In step 85, the keyed modulation stream is sent to at least one MSC which forwards it in the direction of the recipient. In step 86, the MSC determines that the recipient is not capable of receiving a dit-dah encoded text message. Consequently, the keyed modulation stream is diverted to the DSP demodulator in step 87. The DSP decodes the text message in step 88 and formats it into a standard SMS text message which is forwarded to the SMS gateway in step 89. In step 90, the signaling network delivers the SMS text message in a conventional manner so that it can be received by a conventional handset. Network congestion is reduced and transport efficiency improved by using a keyed modulation stream during at least a portion of the signal chain between handsets.

What is claimed is:

1. A text messaging system for conveying text messages between a sender and a recipient in a wireless carrier network, comprising:
   a sender mobile handset including manual input for identifying text characters in a message to be sent to the recipient, an audio-band encoder coupled to the manual input for representing the text characters with a keyed modulation stream, wherein the keyed modulation stream is transmitted over a non-signaling channel of the wireless carrier network to a base station, wherein the manual input includes a plurality of text character-associated keys for generating ASCII code, and wherein the audio band encoder converts the ASCII code to a dit-dah code prior to encoding with a keyed modulation;
   at least one mobile switching center in the wireless carrier network transporting the message between the sender mobile handset and the recipient mobile handset;
   a demodulator operating on behalf of the recipient for converting the keyed modulation stream to decoded text; and
   a recipient mobile handset including a display interface and a display for receiving the decoded text and displaying the text characters of the message to the recipient.

2. The system of claim 1 wherein the audio-band encoder is comprised of a dit-dah generator and a modem.

3. The system of claim 1 wherein the dit-dah code is comprised of Morse code.

4. The system of claim 1 wherein the keyed modulation is comprised of on-off keying.

5. The system of claim 1 wherein the keyed modulation is comprised of frequency-shift keying.

6. The system of claim 1 wherein the keyed modulation is comprised of phase-shift keying.

7. The system of claim 1 wherein the non-signaling channel is comprised of a voice channel.

8. The system of claim 1 wherein the demodulator resides in the recipient mobile handset, wherein the non-signaling channel is comprised of a voice channel, and wherein the keyed modulation stream is provided end-to-end between the sender mobile handset and the recipient mobile handset.

9. The system of claim 1 wherein the demodulator resides in the wireless carrier network, and wherein the system further comprises:
   an SS7 network within the wireless carrier network for delivering SMS text messages to the recipient mobile handset; and
   an SMS gateway coupled to the demodulator and the SS7 network for forwarding at least a portion of the decoded text to the recipient mobile handset.

10. The system of claim 1 further comprising:
    a voicemail platform for storing the message when the recipient mobile handset is busy during initial sending of the keyed modulation stream.

11. The system of claim 10 wherein the voicemail platform records the keyed modulation stream for substantially exact reproduction during later retrieval to the recipient mobile handset.

12. A method of sending mobile to mobile text messages via a wireless cellular carrier network, comprising the steps of:
    manually entering text characters using a manual input of a sender mobile handset, wherein the manual input includes a plurality of text character-associated keys for generating ASCII code;
    converting the ASCII code to a dit-dah code;
    converting the dit-dah code to a keyed modulation stream within the audio band;
    transmitting the keyed modulation stream to a base station over a non-signaling channel of the wireless cellular carrier network;
    at least one mobile switching center forwarding the keyed modulation stream between the sender mobile handset and a recipient mobile handset;
    converting the keyed modulation stream to decoded text after forwarding by the mobile switching center; and
    displaying the decoded text on the recipient mobile handset.

\* \* \* \* \*